May 22, 1945. J. W. TETER 2,376,833
ART OF CRACKING HYDROCARBONS
Filed Feb. 19, 1941
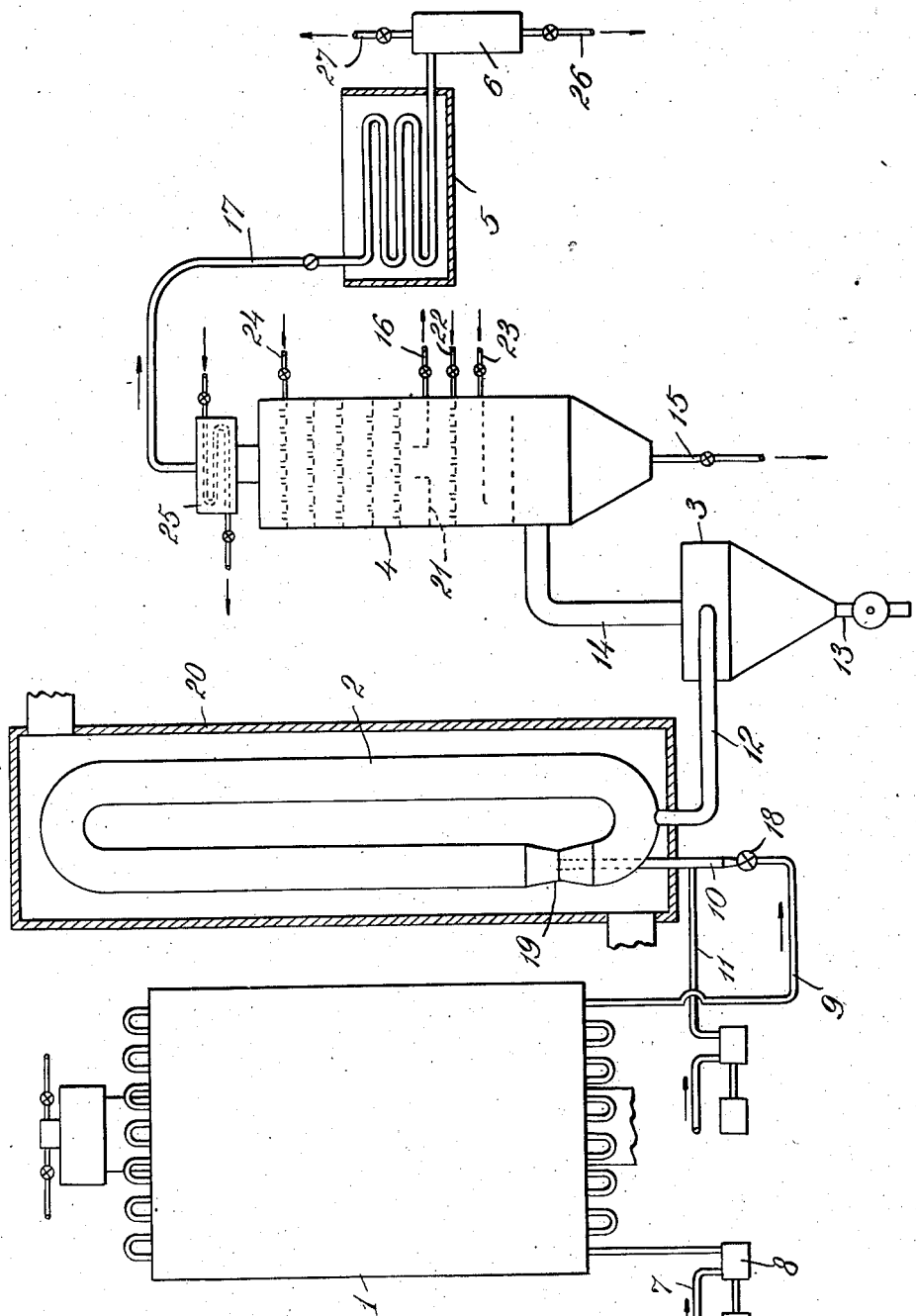
INVENTOR
John W. Teter
BY
Pennie, Davis, Marvin and Edmonds
ATTORNEYS Patented May 22, 1945

2,376,833

UNITED STATES PATENT OFFICE 2,376,833

ART OF CRACKING HYDROCARBONS

John W. Teter, Chicago, Ill., assignor to Sinclair Refining Company, New York, N. Y., a corporation of Maine Application February 19, 1941, Serial No. 379,594

3 Claims. (Cl. 196—52)

My present invention relates to improvements in the production of motor fuel gasoline of high anti-knock value by conversion of higher boiling hydrocarbons, or hydrocarbons of the same general boiling range but of lower anti-knock value, induced by contact with a catalyst at elevated temperature. The general objects of my invention include, in processes for such production of motor fuel gasoline, improvements in efficiency and economy, improvements in yield and particularly in reduced production of normally incondensible gases, and improvements in the anti-knock value of the product.

In thermal conversion processes in which catalysis is not an important element, if the hydrocarbons are processed in the vapor phase, or with any substantial part in the vapor phase, pressure is, in one aspect, an expression of the time factor. That is, in any given apparatus with a fixed charging rate increases in pressure increase the time over which the hydrocarbons are subjected to the process. Thus, since the rates of the conversion reactions increase with increasing temperature, higher pressures can be used to secure the same general results as higher temperatures provided the temperature difference is not such as to involve changes in the reactions characteristic of the conversion. In thermal conversion processes involving catalysis, temperature, time and pressure are also controlling factors, but the relationship does not appear to be the same, particularly when related to qualities of the product such as anti-knock value.

I have found that a minimum period of contact between hydrocarbons and catalyst under conversion conditions is required to secure high yields of a motor fuel gasoline product of high anti-knock value with low gas production, that the production of gasoline per unit of catalyst per unit of time should be limited to maintain production of a product of high anti-knock value, and that increasing the apparent period of catalyst contact by increasing the pressure does not have the same effect as otherwise increasing the period of catalyst contact at the same pressure. The process of my present invention embodies one application of these discoveries. More particularly, the objects of my invention include the provision of a process in which catalyst contact is cyclically maintained within the system, of a process in which catalyst contact is satisfactorily maintained for an appropriate minimum period, of a process in which catalyst contact is maintained without requiring substantial pressure increases in the region of catalyst contact, of a process in which the production of gasoline per unit of catalyst per unit of time can be limited without corresponding limitation of total gasoline production per unit of catalyst or per unit of time, and of a process in which substantially optimum conditions for the desired conversion can be maintained throughout the region of catalyst contact.

In the process of my invention a charge of hydrocarbons substantially in vapor phase is maintained in a cycle of movement in a closed stream, hydrocarbons to be processed and a conversion catalyst are introduced into this stream, the catalyst is maintained in suspension in the circulating stream of hydrocarbons by the velocity of movement in the cycle, a part of the stream of hydrocarbons and suspended catalyst is discharged from the cycle, and spent catalyst and a gasoline fraction are separated from the discharged part. The cyclically circulating stream of hydrocarbons and suspended catalyst is maintained at a temperature and under a pressure for a period of time appropriate to effect the conversion. The temperature is of the order of 950°–1050° F. A temperature of 1025°–1050° F. is an approximate optimum for many stocks. At temperatures much below about 950° F. the reaction rate begins to fall without any corresponding advantage in terms of the anti-knock value of the product. As the temperature approaches about 1050°–1100° F., the gas production begins to increase without any corresponding advantage, and sometimes with actual loss, in terms of the anti-knock value of the product unless high ratios of catalyst to hydrocarbons to be processed are used. The pressure is of an order low enough to permit vaporization of the hydrocarbons to be processed at the temperature used. In general the pressure should not exceed about 100 pounds per square inch; usually a pressure of the order of 30–75 pounds per square inch is advantageous. The conversion temperature used is with advantage maintained substantially uniform throughout the cycle. The rate of introduction of hydrocarbons to be processed and the conversion catalyst and the rate of discharge of hydrocarbons and suspended catalyst from the cycle correspond and are regulated to maintain the hydrocarbons to be processed within the cycle for a minimum period of about 15–25 seconds. With appropriate catalyst: hydrocarbons ratios, depending upon the activity of the catalyst, the average processing time in the cycle need not substantially exceed this minimum, although much longer periods are useful in carrying out my invention. For example, the period may be as much as 200 or 300 seconds or more. Usually, optimum results are to be secured with a period of the order of 30-90 seconds. With fuller's earth as the conversion catalyst, for example, a catalyst:hydrocarbons ratio by weight of from 20:100 to 100:100 or somewhat higher may be used for example. The process of my invention is appropriately applied with the known conversion catalysts generally. With more active conversion catalysts, the catalyst:hydrocarbons ratio is with advantage usually reduced in more or less general correspondence with the increase in activity of the catalyst as compared to the ratios indicated as useful with fuller's earth. The conversion catalyst should be reduced to a fine state of subdivision before use, for example to 200 mesh or finer, to facilitate its suspension by the velocity of movement of the hydrocarbon vapors in the cycle of my process. The movement of the hydrocarbon vapors in the cycle is with advantage maintained by injecting the hydrocarbons to be processed into the circulating stream of hydrocarbons as a jet. Circulation of the hydrocarbons is thus maintained and suspension of the catalyst is thus promoted and maintained in a particularly advantageous manner. A plurality of such jets may be introduced at a number of points in the cycle to assist in the maintenance of uniform conditions throughout the cycle.

The process of my invention will be further described in connection with the accompanying drawing which illustrates, diagrammatically and conventionally, in elevation and partly in section and with parts broken away, one form of apparatus appropriate for carrying out the process.

The apparatus illustrated in the drawing comprises a heater 1, a reaction chamber 2, a separator 3, a fractionating tower 4, a condenser 5 and a receiver 6. Hydrocarbon oil to be processed, supplied through connection 7, is forced, by means of pump 8, through the heater 1 and, through connection 9 and jet pipe 10, into the reaction chamber 2. The conversion catalyst is forced into the reaction chamber 2 through connection 11 and jet pipe 10. Hydrocarbons and suspended catalyst are discharged from the reaction chamber 2 through connection 12 into separator 3. Spent catalyst is discharged from the separator 3 through connection 13. The hydrocarbons pass through connection 14 to the lower end of the fractionating tower 4. A heavy fraction and an intermediate fraction separated in the fractionating tower are discharged through connections 15 and 16, respectively, and a gasoline fraction, separated as an overhead vapor fraction, passes to the receiver 6 through connection 17 and condenser 5.

The stock to be processed, a gas oil fraction for example, is brought, in the heater 1, to a temperature, measured as it enters the jet pipe 10, approximating 1000°-1050° F. or somewhat higher. This heating is with advantage carried out at rate so high that cracking in the heater 1 is kept at a minimum as a result of limitation of the time factor. The heater 1 may be operated under pressure just sufficient to effect discharge of the hydrocarbons into the reaction chamber 2. However, the heater 1 is with advantage operated under a substantially higher pressure than that maintained in the reaction chamber 2, the discharge pressure being reduced and regulated by means of valve 18. The discharge pressure from the heater 1, for example, may approximate 200–600 pounds per square inch. Substantially all or part of such pressure reduction upon discharge from the heater 1 may also be effected during flow through the jet pipe 10. The conversion catalyst, fuller's earth of 200 mesh or finer for example, is forced into the jet pipe 10 through connection 11 and is carried through the jet pipe and introduced into the reaction chamber by the stream of hydrocarbons discharged from the heater 1. The conversion catalyst may be forced into the jet pipe as a slurry, in a hydrocarbon oil corresponding to the stock to be processed for example, or it may be forced into the jet pipe 10 as a pulverulent solid by means of appropriate feeding mechanism, for example as described in my application Serial No. 339,458, filed June 8, 1940. The catalyst:hydrocarbons ratio is fixed by proportioning the charging rates of the stock to be processed and the conversion catalyst.

The heater 1 may be of any conventional type. As illustrated it is of the type described in Letters Patent No. 1,717,334, granted June 11, 1929, on an application of Luis de Florez, arranged for downdraft operation. With this type of furnace the heating coils are with advantage divided into two or more banks of series connected heating tubes, the several banks being connected in parallel.

In the reaction chamber 2, the hydrocarbons are maintained at a conversion temperature and under a conversion pressure while contact between the catalyst and the hydrocarbons is cyclically maintained, these conversion conditions and the catalyst suspension being maintained substantially uniform by the velocity of movement around the path of cyclic flow within the reaction chamber. The reaction chamber proper comprises a tube arranged to provide for circulation of contained hydrocarbons in a closed stream. The cross section of this tube is constricted adjacent the discharge end of the jet pipe 10, as illustrated at 19, to promote the effect of hydrocarbons entering at high velocity through the jet pipe 10 in maintaining rapid cyclic circulation of the hydrocarbons in the reaction chamber 2. In operation, the hydrocarbon contents of the reaction chamber, at the temperatures and under the pressures indicated, are substantially in vapor phase, although some unvaporized oil may be present as a mist or fog and although some condensation of hydrocarbons may take place upon the suspended catalyst particles. The heat to maintain the conversion temperature in the reaction chamber 2 may be supplied as sensible heat of the hydrocarbons introduced through jet pipe 10, the reaction chamber 2 being thermally insulated to maintain the temperature, or, and usually with advantage, this heat may be supplemented for example by mild external heating of the reaction chamber 2, by circulating heating gases through an oven 20 in which the reaction chamber is arranged, as in the apparatus illustrated for example. To maintain uniform temperature conditions in such an oven, a large part, for example as much as 90%, of the heating gases leaving the oven may be recirculated therethrough together with a correspondingly small part of makeup hot products of combustion from an appropriate furnace. The heating of the heater 1 and the reaction chamber 2 may with advantage be carried out in the general manner described for heating the heating coils and the reaction chambers in Letters Patent No. 1,949,655, granted March 6, 1934, on an application of Harry L. Pelzer. As previously indicated, two or more jet pipes and cooperating constrictions, 10 and 19, may be arranged at spaced points along the cyclic path of travel through the reaction chamber, although but a single jet pipe and constriction is illustrated in the accompanying drawing. Also, a plurality of reaction chambers arranged as described may be operated in parallel.

In the separator 3, maintained at high temperature by appropriate thermal insulation, the bulk of the suspended catalyst is separated, again by the familiar cyclone effect, from that part of the hydrocarbon-catalyst mixture discharged from the reaction chamber 2 through connection 12. The separated spent catalyst is discharged through an appropriate seal, such as a "star" mechanism, for regeneration or other disposal. The remaining vapor mixture of hydrocarbons containing a small proportion of suspended catalyst is discharged into the fractionating tower 4 through connection 14.

The fractionating tower 4 is in effect two fractionating towers divided by the plate 21. In the lower part a heavy fraction in the form of a tar containing the catalyst remaining in suspension after the hydrocarbons have passed through the separator 3 is condensed and separated and discharged through connection 15. To facilitate this separation and to promote cleanliness of the vapor mixture leaving the lower part of the tower, a number of open baffles followed by one or more "bubble" trays are arranged above the point of entrance of connection 14 and below the plate 21 and a refluxing medium, serving also as a wash oil, is introduced over one or more of these trays or baffles. For example, a reduced crude petroleum containing a gas oil stock appropriate to be supplied to the heater 1 may be introduced through either or both connections 22 and 23, the gas oil stock being vaporized from the crude to escape from the lower part of the tower with the lower boiling vapors from the separator 3 and the consequent cooling and washing of the vapors in the lower part of the tower serving to separate a tar containing the small proportion of suspended catalyst remaining in the vapors from the separator 3. The temperature of the vapor mixture passing through the plate 21 may approximate 650°–775° F. for example under a pressure at this point of about 20–30 pounds per square inch. In the upper part of the tower 4, a gasoline fraction or a fraction containing a substantial proportion of gasoline is separated from a higher boiling fraction, the latter being discharged through connection 16 from above plate 21. This intermediate fraction may be supplied through connection 7 to heater 1 and may constitute all or part of the stock supplied to the heater. Fractionation in the upper part of the tower may be controlled by the direct introduction of a refluxing medium, for example a part of the condensate separated in the receiver 6, through connection 24 or by circulation of a cooling or heat exchange medium through dephlegmator 25 or by these means jointly. The temperature of the vapor mixture leaving the upper end of tower 4 may approximate 365°–385° F. The lower and upper parts of the fractionating tower 4 may with advantage be operated in the manner described for the first and second fractionating towers (4 and 12), respectively, in Letters Patent No. 1,810,048, granted June 16, 1931, on an application of Eugene C. Herthel.

The gasoline fraction condensed in condenser 5 from the overhead vapor fraction discharged from tower 4 through connection 17 is discharged from receiver 6 through connection 26 and the mixture of gases and vapors remaining uncondensed is discharged through connection 27, for example to appropriate apparatus for the recovery of condensible hydrocarbon components of this mixture.

In carrying out the process of my invention, catalyst contact is cyclically maintained in the reaction chamber by the velocity of flow of hydrocarbons maintained in the cycle of movement within the reaction chamber. The velocity in this same cycle of movement also maintains substantially uniform conditions throughout the region of catalyst contact thus permitting the maintenance of substantially optimum conversion conditions through this region. Further, mechanical working parts exposed to the hydrocarbons and to the catalyst in the region of catalyst contact for maintaining this velocity of movement are rendered unnecessary. The period of catalyst contact, and particularly the minimum period, is easily controlled and is easily maintained within the stated limits, and this is accomplished without requiring substantial pressure increases, for example such as might be involved in the pressure drop through a long single pass tube with a rate of flow through the tube high enough to maintain catalyst suspension. Similarly, the production of gasoline per unit of catalyst per passage through the cycle in the reaction chamber can be limited to produce a product of high anti-knock value without involving losses in catalyst separation and reheating of the hydrocarbons which would be involved but for the cyclic character of the process of my invention. In this manner my process affords improvements in efficiency and economy, improvements in yield and improvements in the anti-knock value of the product.

I claim:

1. In the production of gasoline, the improvement which comprises maintaining a charge of hydrocarbons substantially in vapor phase in a rapidly moving substantially uniform cycle of movement in a closed stream, introducing hydrocarbons to be processed and a conversion catalyst into said stream, maintaining the catalyst in suspension in the circulating stream of hydrocarbons and substantially uniformly distributed therethrough by the velocity of movement in the cycle, maintaining said circulating stream of hydrocarbons and suspended catalyst at a temperature of the order of 950°–1050° F. under a pressure not exceeding about 100 pounds per square inch for a minimum period of about 15–25 seconds, discharging a part of said stream of hydrocarbons and suspended catalyst, and separating spent catalyst and a gasoline fraction from that discharged part.

2. In the production of gasoline, the improvement which comprises maintaining a charge of hydrocarbons substantially in vapor phase in a rapidly moving substantially uniform cycle of movement in a closed stream by injecting hydrocarbons to be processed into said stream as a jet, introducing a conversion catalyst into said stream, maintaining the catalyst in suspension in the circulating stream of hydrocarbons and substantially uniformly distributed therethrough by the velocity of movement in the cycle, maintaining said circulating stream of hydrocarbons and suspended catalyst at a temperature of the order of 950°–1050° F. under a pressure not exceeding about 100 pounds per square inch for a minimum period of about 15–25 seconds, discharging a part of said stream of hydrocarbons and suspended catalyst, and separating spent catalyst and a gasoline fraction from that discharged part.

3. In the production of gasoline, the improvement which comprises maintaining a charge of hydrocarbons substantially in vapor phase in a rapidly moving substantially uniform cycle of movement in a closed stream, introducing hydrocarbons to be processed and a conversion catalyst into said stream, maintaining the catalyst in suspension in the circulating stream of hydrocarbons and substantially uniformly distributed therethrough by the velocity of movement in the cycle, maintaining said circulating stream of hydrocarbons and suspended catalyst at a temperature substantially uniform throughout the cycle and of the order of 950°–1050° F. under a pressure not exceeding about 100 pounds per square inch for a minimum period of about 15–25 seconds, discharging a part of said stream of hydrocarbons and suspended catalyst, and separating spent catalyst and a gasoline fraction from that discharged part.

JOHN W. TETER.